No. 866,622. PATENTED SEPT. 24, 1907.
E. CHRISTMAN & DE WITT A. MOON.
SCRAPER FOR GROUND WORKING DISKS.
APPLICATION FILED NOV. 8, 1906.
2 SHEETS—SHEET 1.
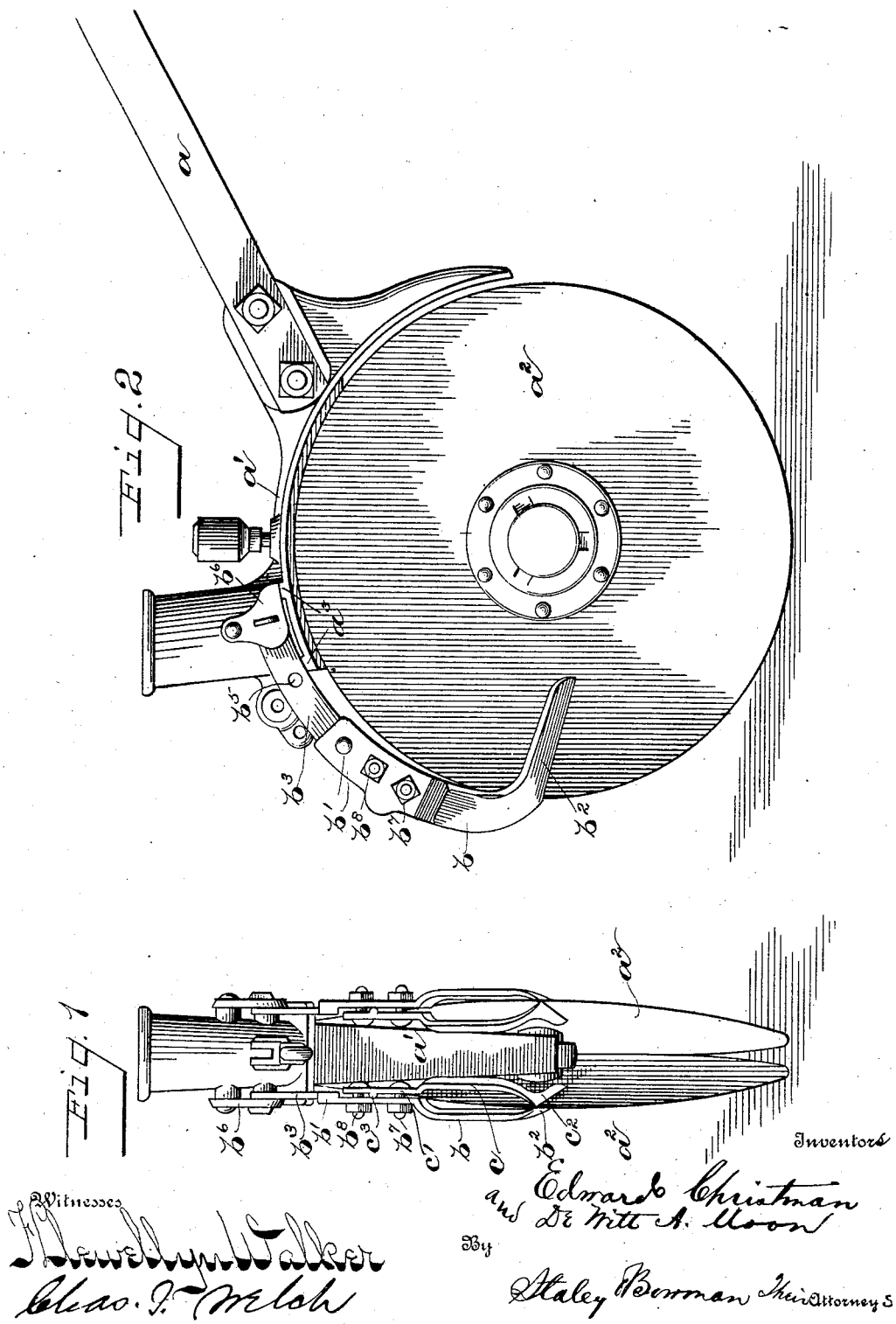

No. 866,622. PATENTED SEPT. 24, 1907.
E. CHRISTMAN & DE WITT A. MOON.
SCRAPER FOR GROUND WORKING DISKS.
APPLICATION FILED NOV. 8, 1906.
2 SHEETS—SHEET 2.
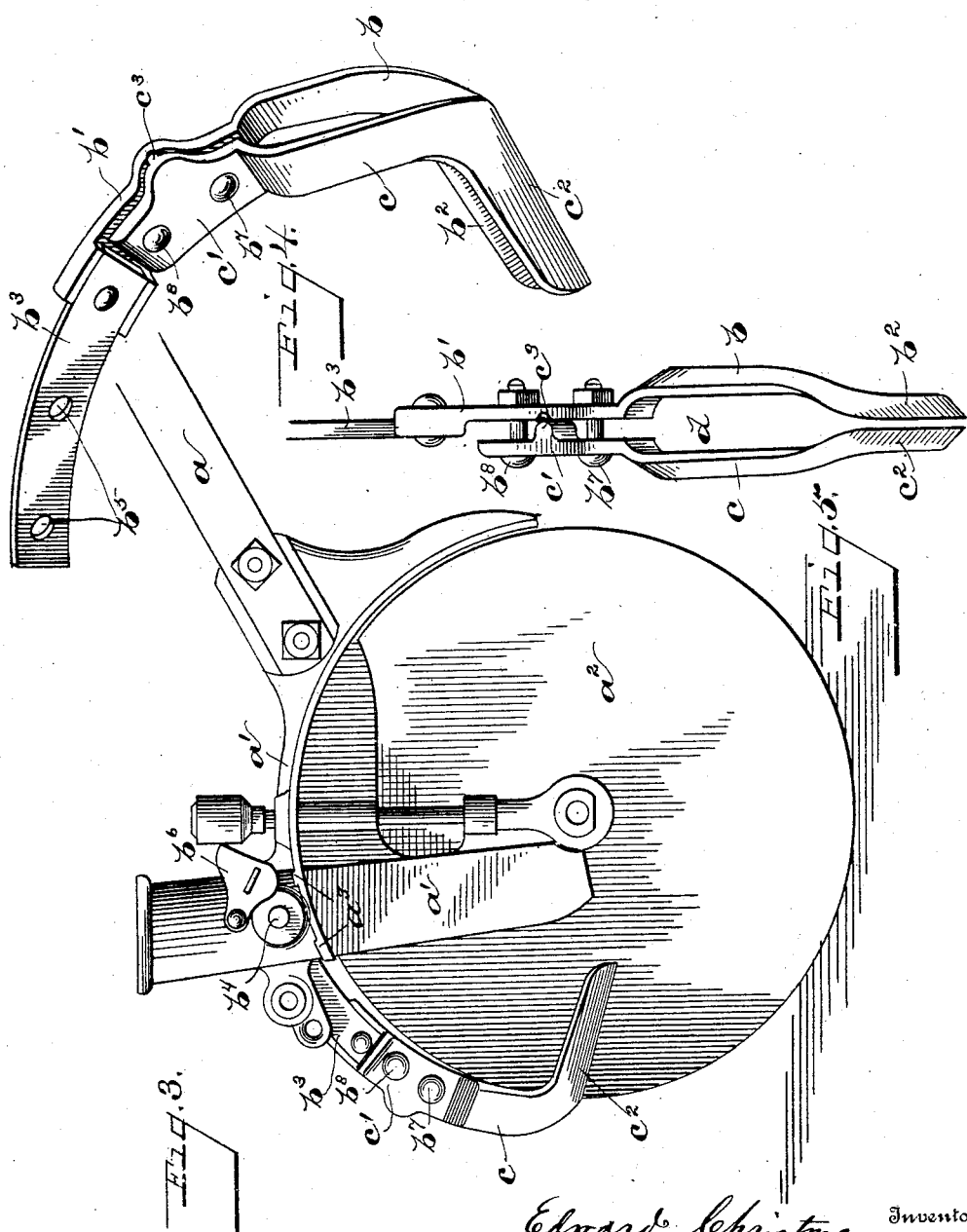

UNITED STATES PATENT OFFICE.

EDWARD CHRISTMAN AND DE WITT A. MOON, OF LOUISVILLE, KENTUCKY, ASSIGNORS TO THE AMERICAN SEEDING MACHINE COMPANY, OF SPRINGFIELD, OHIO, A CORPORATION OF OHIO.

SCRAPER FOR GROUND-WORKING DISKS.

No. 866,622.        Specification of Letters Patent.        Patented Sept. 24, 1907.

Application filed November 8, 1906. Serial No. 342,576.

*To all whom it may concern:*

Be it known that we, EDWARD CHRISTMAN and DE WITT A. MOON, citizens of the United States, residing at Louisville, in the county of Jefferson and State of Kentucky, have invented certain new and useful Improvements in Scrapers for Ground-Working Disks, of which the following is a specification.

This invention relates to improvements in furrow opening or other ground working disks, and it especially relates to an improved scraper for such devices.

An object of the invention is to provide a scraper which will readily clear itself of soil and trash scraped from the disk and also one which will have its parts removed from the way of clods, stalks, grass, etc., that the device may meet with in its travel through the ground.

A further object is to provide a scraper that can be easily and quickly removed without the aid of tools.

A further object is to provide improved means for adjusting the scrapers in their relation to the disks.

Our invention consists in the constructions and combinations of parts hereinafter described and set forth in the claims.

In the accompanying drawings, which form a part of this specification, Figure 1 is a rear view of a double disk furrow opening device embodying the invention. Fig. 2 is a side elevation of the same. Fig. 3 is a side elevation of the device with one of the disks removed. Figs. 4 and 5 are detail views of the scraper.

Like parts are represented by similar characters of reference in the several views.

In the said drawings, the invention is shown applied to a furrow-opener for grain drills of the double disk type, but the invention is equally applicable to other forms of ground-working disks for other classes of agricultural machinery.

In the device illustrated, $a$ represents the usual drag-bar, pivoted at its front end to the frame of the machine in the usual way and connected at its rear end to the frame of the furrow opening device, represented by $a'$; this frame containing the usual conduit to carry the seed to the furrow opened by the disks $a^2$ $a^2$ and also having bearings for the disks. Our improved scraper is one designed to work on opposite sides of the disk.

$c$ and $b$ represent the respective blades of the scraper, formed integrally with shanks, $b'$ $c'$, at one end and at the other having laterally extending portions, $b^2$, $c^2$, extending across the face of each side of the disk and forming the scrapers proper. The shank, $b'$, is extended by riveting or otherwise securing thereto a curved flat steel portion, $b^3$, having an opening adapted to fit a projecting stud, $b^4$, on the said frame, and being supported on two projecting lugs $a^3$ $a^3$ on said frame located on either side of the stud, $b^4$; this construction maintaining the shank and blades in proper relation with the disk. Pivoted to said frame above said stud is a swinging latch, $b^6$, having a frictional engagement with the stud which serves the purpose of securing the said scraper shank, $b^3$, in position on said stud and its supporting lugs. The connection of the part, $b^3$, with said stud is a loose one for the purpose of permitting a sufficient amount of play at the point of connection to compensate for any irregularity in the oscillation of the disk due to wear or other causes and also to permit the adjustment of the scraper blades as hereinafter described. The point of connection of the scraper shank with the frame, it will be seen, is in close proximity to the surface of the disk and the said shank and its blade extends rearwardly around and in close proximity to the disk's periphery, thus removing that part of the scraper from the path of clods, stalks, etc., which the device meets in its travel.

The shank, $c'$, is secured to the shank, $b'$, through the medium of two bolts, $b^7$ $b^8$. In order that the blades may be nicely and accurately adjusted in relation to the disk, we have provided between the bolts on the part $c'$ a rib, $c^3$, extending across the shank, and on the part $b^1$, a recess to receive the rib; said recess being of shallow depth as compared with the depth of the rib. By loosening the bolts the parts can be rocked about the rib to adjust the blades to the surface of the disk.

The respective scraping blades, $b$ and $c$, it will be seen, are offset in opposite directions or recede from each other, as shown at $d$, for the purpose of allowing trash or soil which may be carried up by the cutting edge of the disk to pass through without lodging on the scrapers. The shank, $b^3$, may be provided with two or more openings, $b^5$, or points of attachment so as to change the position of the scrapers as required.

Having thus described our invention, we claim:

1. In a disk ground-working device, a frame, a revolving disk journaled in said frame, a scraping blade on each side of said disk, and a supporting shank for said blades connected to said frame, said shank being adapted to extend along in the same plane with and adjacent to the periphery of said disk, substantially as and for the purpose specified.

2. In a disk ground-working device, a frame, a revolving disk mounted thereon, and a scraper for said disk connected to the frame, said scraper consisting of a shank extending along in the same plane with and in close proximity to the periphery of said disk, and terminating in lateral blades adapted to extend across the face of each side of said disk, respectively, substantially as and for the purpose specified.

3. In a disk ground-working device, a frame, a disk mounted thereon, a scraper for said disk having a shank connected to said frame and adapted to extend along and in close proximity to the periphery of said disk and terminating in lateral blades adapted to extend on opposite sides of said disk, respectively, and means for adjusting said blades with reference to each other, substantially as and for the purpose specified.

4. In a ground working disk, a frame, a disk journaled thereon, a shank loosely connected to said frame having a scraping blade for one side of said disk, a scraping blade for the opposite side of said disk and having a connection to said shank, and means for adjusting said blades fixedly with reference to each other, substantially as and for the purpose specified.

5. In a disk ground working device, a frame, a disk mounted thereon, a shank loosely connected to said frame and extending around and in the same plane with and in close proximity to the periphery of said disk, a scraper for each side of said disk connected to said shank, said scrapers being adjustable with reference to each other, substantially as and for the purpose specified.

6. In a disk ground-working device, a frame, a disk mounted thereon, a scraper for said disk having a scraping blade on each side of said disk, bolts for connecting said blades together, and a projecting rib on one of said blades between said bolts, substantially as and for the purpose specified.

7. In a disk ground-working device, a frame, a disk mounted thereon, and a scraper for said disk, and means for connecting said scraper to said frame comprising a swinging latch, substantially as and for the purpose specified.

8. In a disk ground-working device, a frame, a disk mounted thereon, and a scraper for said disk, a projecting stud on said frame extending through an opening in the end of the scraper, and a swinging latch on said frame having a frictional engagement with the end of said stud, substantially as and for the purpose specified.

9. In a disk ground-working device, a frame, a disk mounted thereon, and a scraper for said disk having a shank connected to said frame and extending along in the same plane with and in close proximity to the periphery of said disk and terminating in lateral scraping blades extending on opposite sides of the disk, respectively, said scraping blades being offset and receded in opposite directions at the periphery of the disk, substantially as and for the purpose specified.

10. In a disk ground working device, a frame, a disk mounted thereon, and a scraper for said disk, a projecting stud on said frame extending through an opening in the end of the scraper, supports for said scraper located on said frame on either side of said stud, and a swinging latch, substantially as specified.

In testimony whereof, we have hereunto set our hand this 29th day of October A. D. 1906.

EDWARD CHRISTMAN.
DE WITT A. MOON.

Witnesses:
C. H. ZERCKEL,
H. B. WARREN.